United States Patent
Shiau et al.

(10) Patent No.: US 7,866,868 B2
(45) Date of Patent: Jan. 11, 2011

(54) OPTICAL FILM AND BACKLIGHT MODULE USING THE SAME

(75) Inventors: Tzeng-Ke Shiau, Hsin-Chu (TW); Fu-Ming Chuang, Hsin-Chu (TW); Ching-Shiang Li, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 260 days.

(21) Appl. No.: 12/261,281

(22) Filed: Oct. 30, 2008

(65) Prior Publication Data

US 2010/0014278 A1 Jan. 21, 2010

(30) Foreign Application Priority Data

Jul. 17, 2008 (TW) .............. 97127076 A

(51) Int. Cl.
*F21V 7/04* (2006.01)
*F21V 17/02* (2006.01)

(52) U.S. Cl. .............. 362/606; 362/330; 362/333; 362/97.1; 362/607

(58) Field of Classification Search .............. 362/330, 362/333, 606, 607, 97.1–97.3, 615, 617, 362/619, 620, 623, 625, 626, 311.12, 339; 359/619, 599; 349/64, 65
See application file for complete search history.

(56) References Cited

U.S. PATENT DOCUMENTS

| | | | | |
|---|---|---|---|---|
| 4,054,793 A | * | 10/1977 | Shemitz | 362/127 |
| 4,984,144 A | * | 1/1991 | Cobb et al. | 362/339 |
| 5,914,760 A | * | 6/1999 | Daiku | 349/65 |
| 7,210,836 B2 | * | 5/2007 | Sasagawa et al. | 362/606 |
| 7,726,827 B2 | * | 6/2010 | Hsu et al. | 362/97.2 |
| 7,726,865 B2 | * | 6/2010 | Sato et al. | 362/620 |
| 2006/0250817 A1 | * | 11/2006 | Yamashita et al. | 362/606 |
| 2008/0130114 A1 | * | 6/2008 | Hsu et al. | 359/599 |
| 2008/0225530 A1 | * | 9/2008 | Joo et al. | 362/330 |
| 2009/0122576 A1 | * | 5/2009 | Sato et al. | 362/620 |

* cited by examiner

*Primary Examiner*—Bao Q Truong
(74) *Attorney, Agent, or Firm*—Chun-Ming Shih

(57) ABSTRACT

An optical film has a light incident side and a light emitting side above the light incident side. V shape protrusions disposed side by side are disposed at the light incident side. Collimating units disposed side by side are disposed at the light emitting side. Each of the V shape protrusions and each of the collimating units extend along a predetermined direction. The collimating units are respectively corresponded to the V shape protrusions. Two inclined surfaces of each of the V shape protrusions are respectively a light incident surface and a reflection surface. In each corresponding pair of the V shape protrusion and the collimating unit, a central axis of the collimating unit parallel to the predetermined direction is right above the reflection surface of the V shape protrusion. A backlight module using the optical film is provided to provide a plane light source having high luminance.

18 Claims, 8 Drawing Sheets

OPTICAL FILM AND BACKLIGHT MODULE USING THE SAME

BACKGROUND

1. Technical Field

The present invention relates to an optical film, and particularly to an optical film for a backlight module and a backlight module using the optical film.

2. Description of the Related Art

A backlight module is for providing a plane light source to a liquid crystal display panel (LCD panel). The backlight module may be distinguished into a direct type backlight module and an edge type backlight module according to the incident direction of light rays. The edge type backlight module usually uses a light guide plate to convert the light rays provided by a light source into the plane light source. Moreover, to promote luminance and uniformity of the plane light source, at least an optical film is disposed above a light emitting surface of the light guide plate.

FIG. 1 is a schematic view of a conventional optical film. Referring to FIG. 1, a plurality of V shape protrusions 110 disposed side by side is disposed at a light incident side 102 of the conventional optical film 100. Each of the V shape protrusions 110 has a light incident surface 112 and a reflection surface 114, and the light incident surface 112 and the reflection surface 114 are flat surfaces. Light rays 50 emitting from a light emitting surface of a light guide plate (not shown) are inclined light rays. The light rays 50 are incident into the V shape protrusions 110 from the light incident surfaces 112. Afterward, the light rays 50 are reflected by the reflection surfaces 114 and then emit from a light emitting side 104 of the optical film 1 00.

FIG. 2 is a luminance distribution diagram of the light rays emitting from the optical film of FIG. 1, wherein the transverse axis of the luminance distribution diagram represents a light emitting angle and the vertical axis of the luminance distribution diagram represents luminance. Referring to FIGS. 1 and 2, in the conventional optical film 100, the reflection surfaces 114 may reflect the light rays 50 and let the light rays 50 emit from the light emitting side 104, but the diverging angle of the light rays 50 is not converged. Therefore, the luminance of the backlight module is reduced, especially in the positive direction. In other words, the luminance at 0 degree is low.

FIG. 3 is a schematic view of another conventional optical film. Referring to FIG. 3, a plurality of V shape protrusions 110' disposed side by side is disposed at a light incident side 102' of the conventional optical film 100'. Each of the V shape protrusions 110' has a light incident surface 112' and a light reflection surface 114', each of the light incident surfaces 112' includes a flat surface portion 112a and a curved surface portion 112b, and each of the reflection surfaces 114' includes a flat surface portion 114a and a curved surface portion 114b. The light rays 50 emitting from a light emitting surface of a light guide plate (not shown) are inclined light rays. The light rays 50 are incident into the V shape protrusions 110' from the light incident surfaces 112'. Afterward, the light rays 50' are reflected by the reflection surfaces 114' and then emitting from a light emitting side 104 of the optical film 100'.

FIG. 4 is a luminance distribution diagram of the light rays emitting from the optical film of FIG. 3, wherein the transverse axis of the luminance distribution diagram represents a light emitting angle and the vertical axis of the luminance distribution diagram represents luminance. Referring to FIGS. 3 and 4, in the conventional optical film 100', the diverging angle of the light rays 50 reflected by the curved surface portions 114b of the reflection surfaces 114' is converged, so the luminance of the backlight module is increased in the positive direction. However, the diverging angle of the light rays 50 reflected by the flat surface portions 114a of the reflection surfaces 114' is not converged, so the luminance of the backlight module is not greatly increased in the positive direction.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF SUMMARY

The present invention relates to an optical film for improving luminance of a backlight module.

The present invention further relates to a backlight module for providing a plane light source having high luminance.

To achieve at least one of the above-mentioned advantages or other advantages, an optical film according to an embodiment of the present invention is provided. The optical film has a light incident side and a light emitting side above the light incident side. A plurality of V shape protrusions disposed side by side is disposed at the light incident side, and each of the V shape protrusions extends along a predetermined direction. A plurality of collimating units disposed side by side is disposed at the light emitting side, and each of the collimating units extends along the predetermined direction. The collimating units are respectively corresponded to the V shape protrusions, and two inclined surfaces of each of the V shape protrusions are respectively a light incident surface and a reflection surface. Moreover, in each corresponding pair of the collimating unit and the V shape protrusion, a central axis of the collimating unit is parallel to the predetermined direction and is right above the reflection surface of the V shape protrusion.

To achieve at least one of the above-mentioned advantages or other advantages, a backlight module according to another embodiment of the present invention is provided. The backlight module includes a light guide plate, a light source and the above-mentioned optical film. The light source is disposed beside the light guide plate for providing light rays to the light guide plate, and the optical film is disposed above the light guide plate. The light guide plate is adapted to guide the light rays into the optical film from the light incident surfaces of the V shape protrusions, and the reflection surfaces of the V shape protrusions are adapted to reflect the light rays to the light emitting side of the optical film.

In the embodiments of the present invention, the collimating units are disposed at the light emitting side of the optical film, and in each corresponding pair of the collimating unit and the V shape protrusion, the central axis of the collimating unit is parallel to the predetermined direction and is right above the reflection surface of the V shape protrusion, so the diverging angle of the light rays is converged, and the luminance of the backlight module is consequently improved. Therefore, the backlight module using the optical film can provide the plane light source having high luminance.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 5:
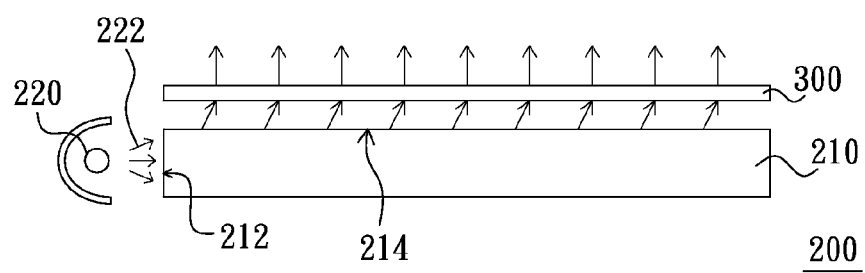
FIG. 5 is a schematic view of a backlight module according to an embodiment of the present invention.
Figure 6:
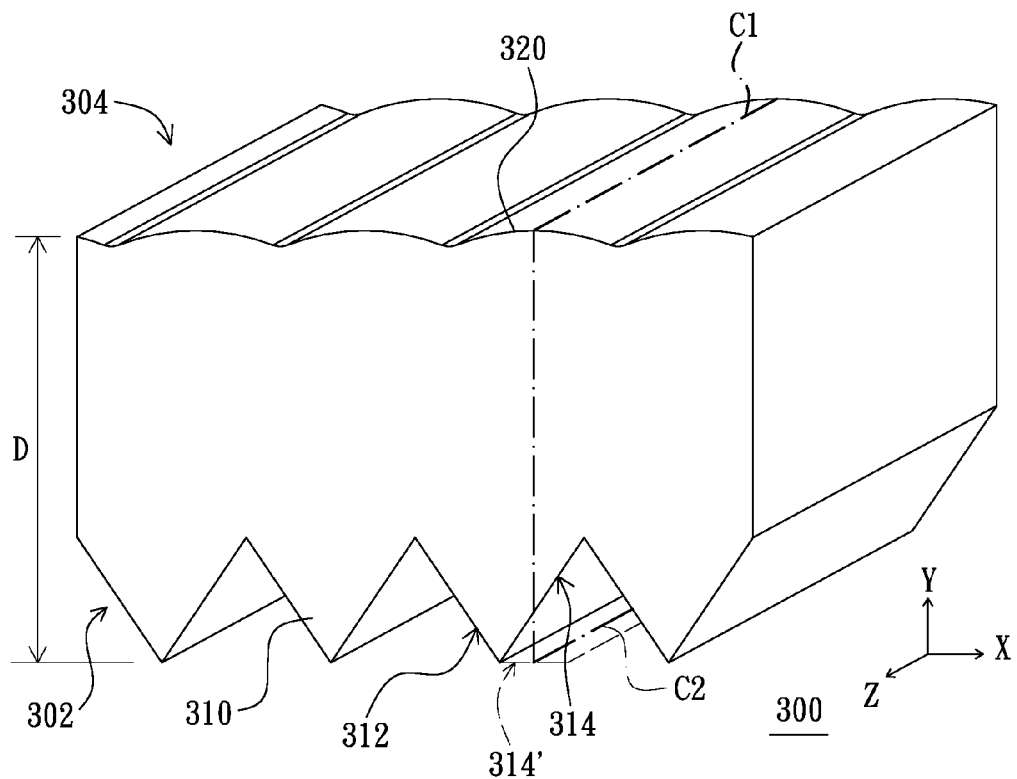
FIG. 6 is a three dimensional view of an optical film of FIG. 5.

FIG. 5 is a schematic view of a backlight module according to an embodiment of the present invention, and FIG. 6 is a three dimensional view of an optical film of FIG. 5. Referring to FIGS. 5 and 6, the backlight module 200 according to the present embodiment includes a light guide plate 210, a light source 220 and an optical film 300. The light source 220 is disposed beside a light incident surface 212 of the light guide plate 210 for providing light rays 222 to the light guide plate 210. The optical film 300 is disposed above a light emitting surface 214 of the light guide plate 210.

The optical film 300 has a light incident side 302 and a light emitting side 304, wherein the light emitting side 304 is above the light incident side 302. A plurality of V shape protrusions 310 disposed side by side is disposed at the light incident side 302, and each of the V shape protrusions 310 extends along a predetermined direction (e.g. a Z axis). A plurality of collimating units 320 disposed side by side is disposed at the light emitting side 304, and each of the collimating units 320 extends along the predetermined direction (i.e. the Z axis). The collimating units 320 are respectively corresponded to the V shape protrusions 310. Two inclined surfaces 312 and 314 of each of the V shape protrusions 310 are respectively a light incident surface and a reflection surface. Moreover, in each corresponding pair of the collimating unit 320 and the V shape protrusion 310, a central axis C1 of collimating unit 320 is parallel to the predetermined direction (i.e. the Z axis) and is right above the reflection surface 314 of the V shape protrusion 310. In the present embodiment, the reflection surface 314 of each of the V shape protrusion 310 may be a total reflection surface.

More specifically, in each corresponding pair of the collimating unit 320 and the V shape protrusion 310, the central axis C1 of the collimating unit 320 is, for example, opposite to a central axis C2 of a virtual image 314' of the reflection surface 314 of the V shape protrusion 310, wherein the central axis C2 is parallel to the predetermined direction (i.e. the Z axis) and the virtual image 314' is defined by the light rays 222 reflected by the reflection surface 314. Furthermore, in each corresponding pair of the collimating unit 320 and the V shape protrusion 310, the virtual image 314' of the reflection surface 314 of the V shape protrusion 310 is, for example, defined about at the focal point of the collimating unit 320. In the present embodiment, each of the collimating units 320 is, for example, a lenticular lens.

Figure 7:
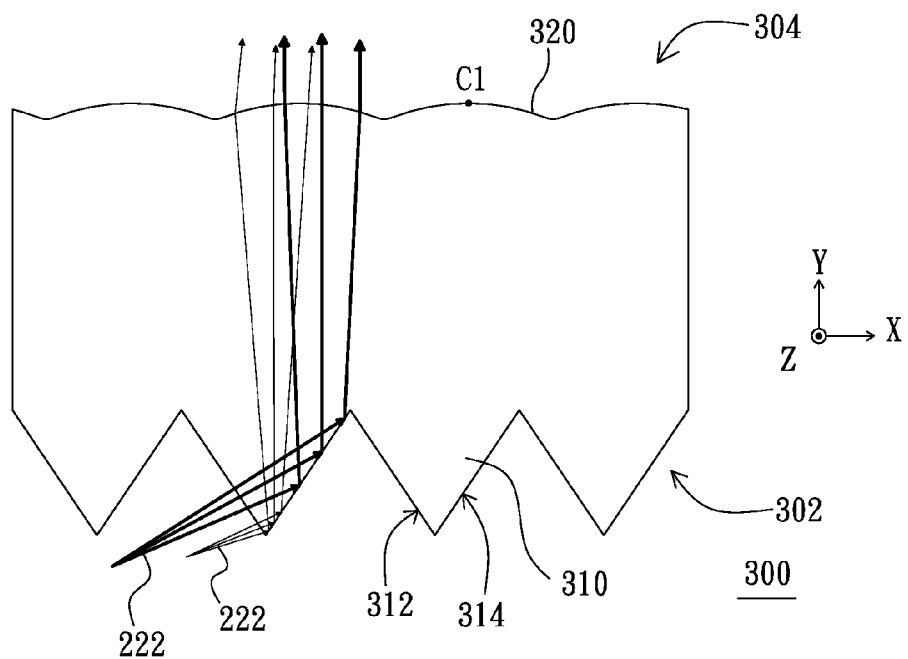
FIG. 7 is a schematic view of light rays being incident into the optical film of FIG. 6.

FIG. 7 is a schematic view of the light rays being incident into the optical film of FIG. 6. Referring to FIGS. 5 to 7, in the backlight module 200 of the present embodiment, after being incident into the light guide plate 210, the light rays 222 emit from the light emitting surface 214 of the light guide plate 210, and then are incident into the optical film 300 from the light incident surfaces 312 of the V shape protrusions 310, wherein the light rays 222 emit from the light guide plate 210 are inclined light rays. Afterward, the reflection surfaces 314 of the V shape protrusions 310 reflect the light rays 222 to the light emitting side 304 of the optical film 300, and then the light rays 222 emit from the collimating units 320.

Due to the light rays 222 being collimated by the collimating units 320, the diverging angle of the light rays 222 can be converged, and the luminance of the backlight module 200 is greatly increased, especially in the positive direction. Moreover, in each corresponding pair of the collimating unit 320 and the V shape protrusion 310, due to the central axis C1 of the collimating unit 320 being opposite to the central axis C2 of the virtual image 314' of the reflection surface 314, viewing angle distribution of the light rays 222 emitting from the light emitting side 304 of the optical film 300 is more symmetrical.

It may be noted that in the present embodiment, the converging angle of the light rays 222 emitting from the optical film 300 can be controlled by adjusting the focal length of each of the collimating units 320 and the interval between the corresponding pair of the collimating unit 320 and the V shape protrusion 310. Furthermore, in the present embodiment, thickness of the optical film 300 is, for example, between 30 micrometers and 500 micrometers.

Figure 1:
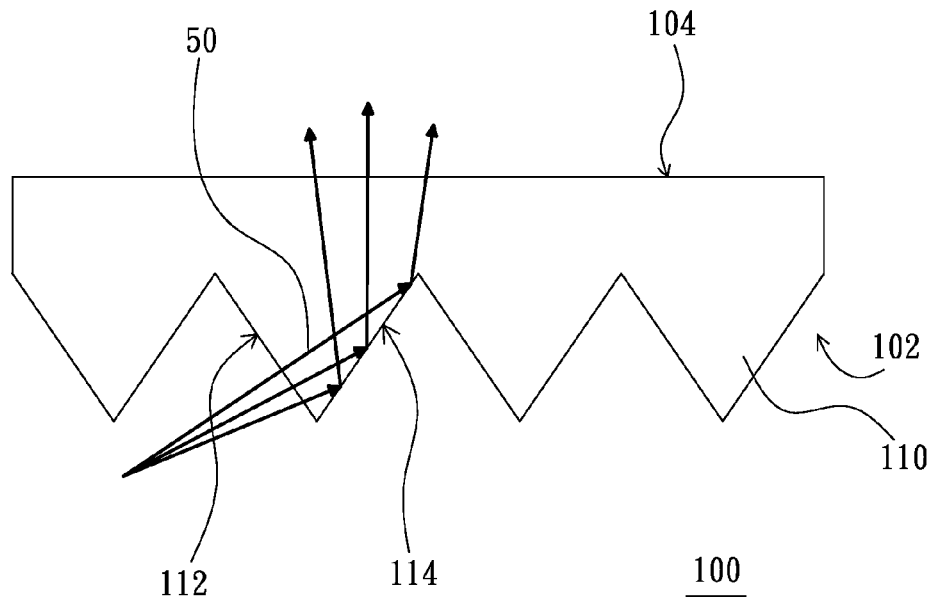
FIG. 1 is a schematic view of a conventional optical film.
Figure 2:
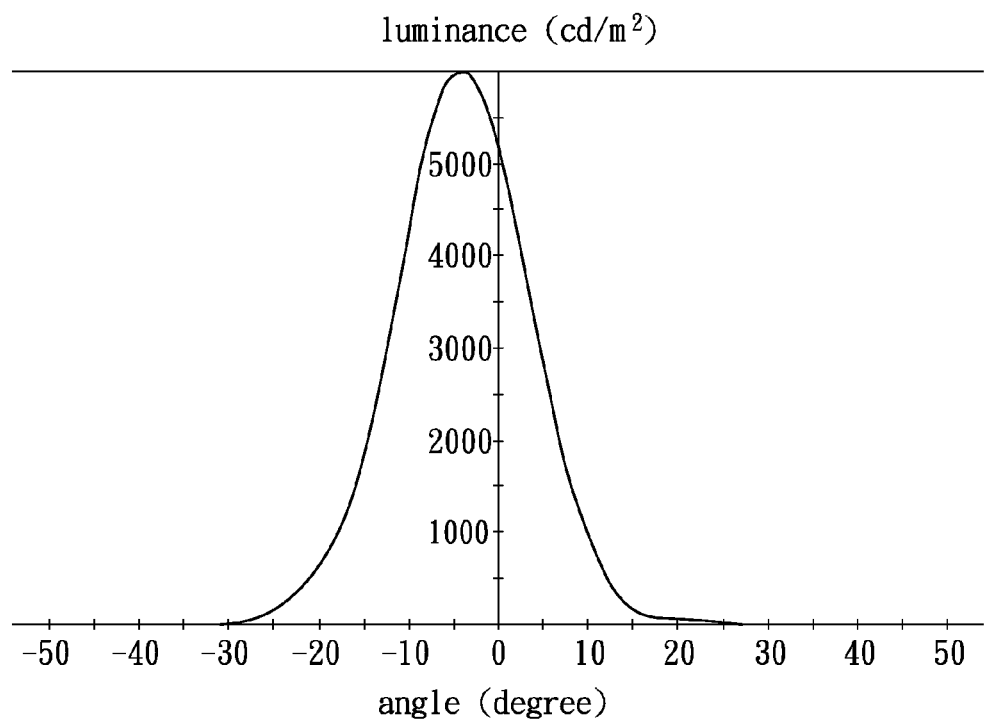
FIG. 2 is a luminance distribution diagram of light rays emitting from the optical film of FIG. 1.
Figure 3:
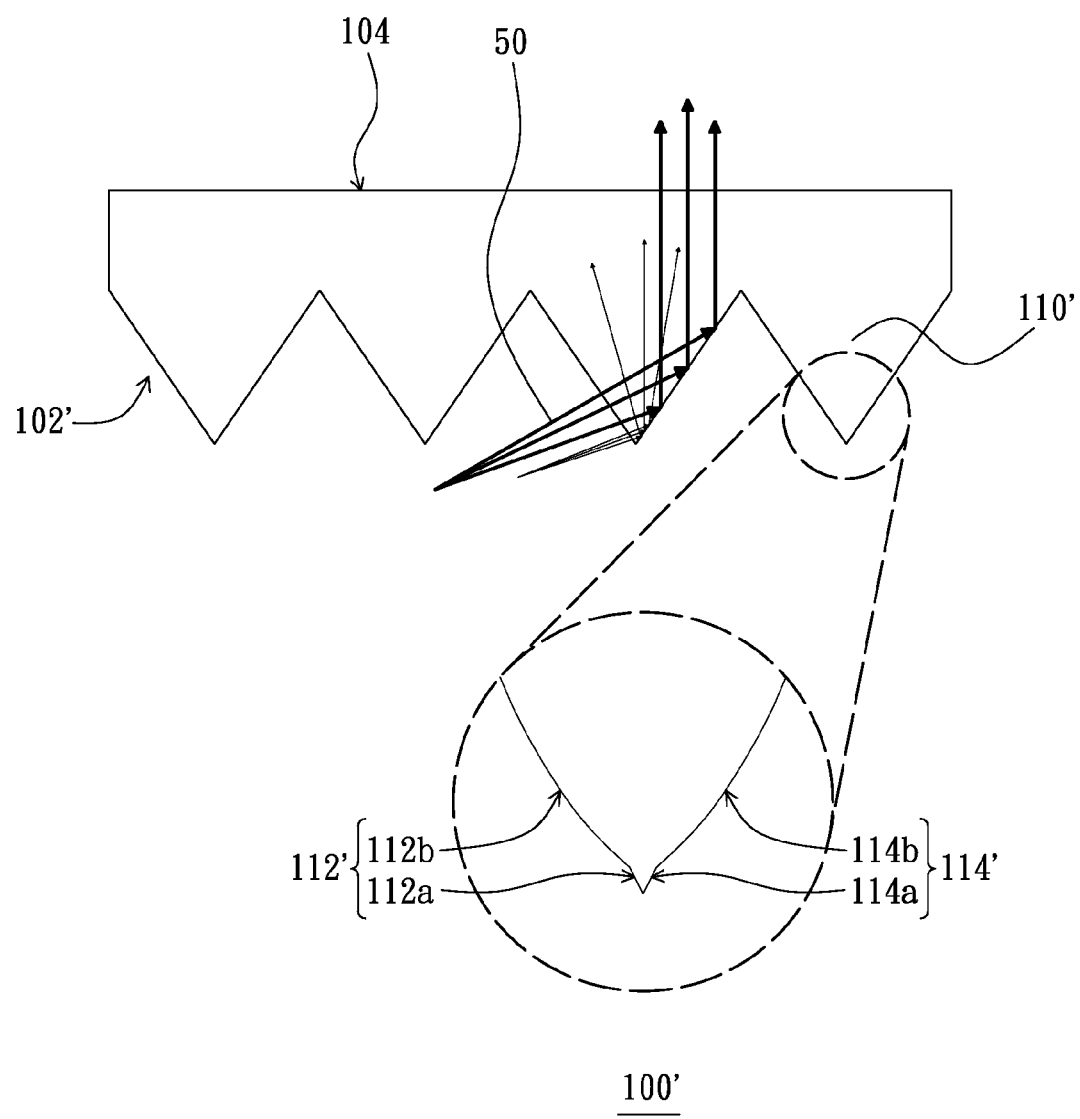
FIG. 3 is a schematic view of another conventional optical film.
Figure 4:
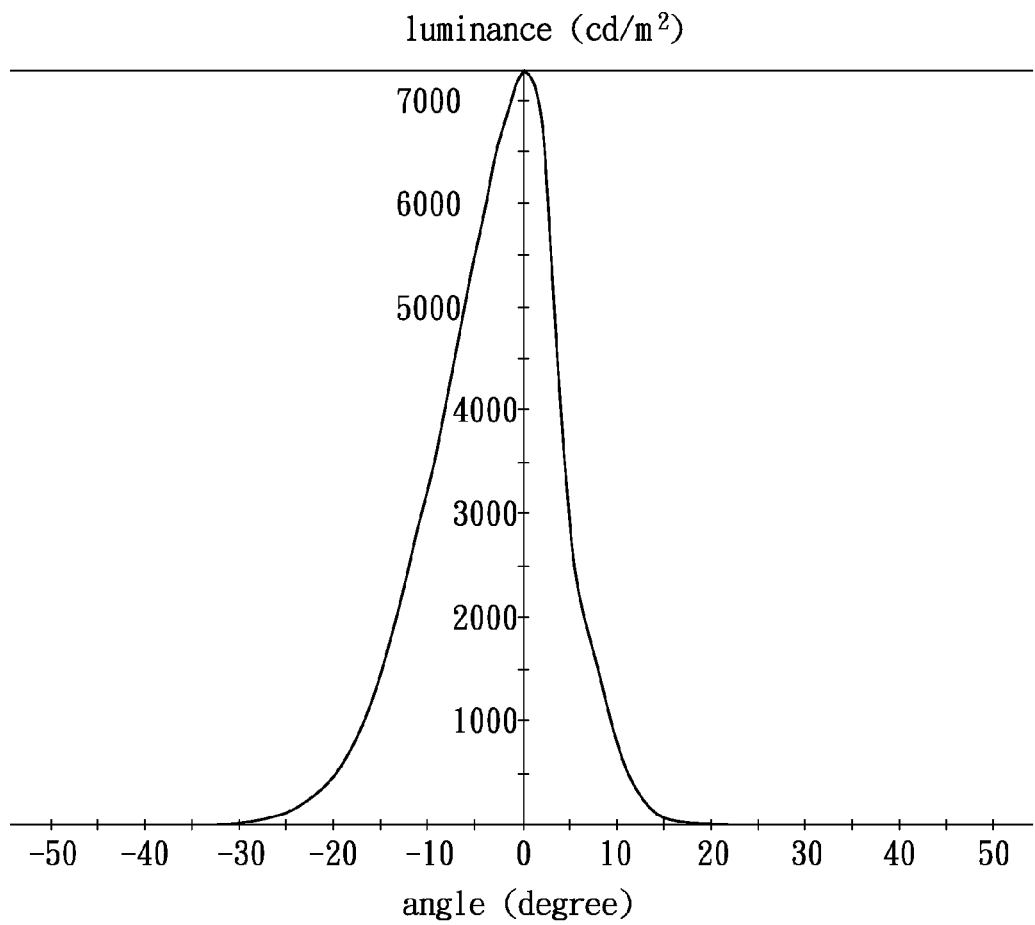
FIG. 4 is a luminance distribution diagram of light rays emitting from the optical film of FIG. 3.
Figure 8:
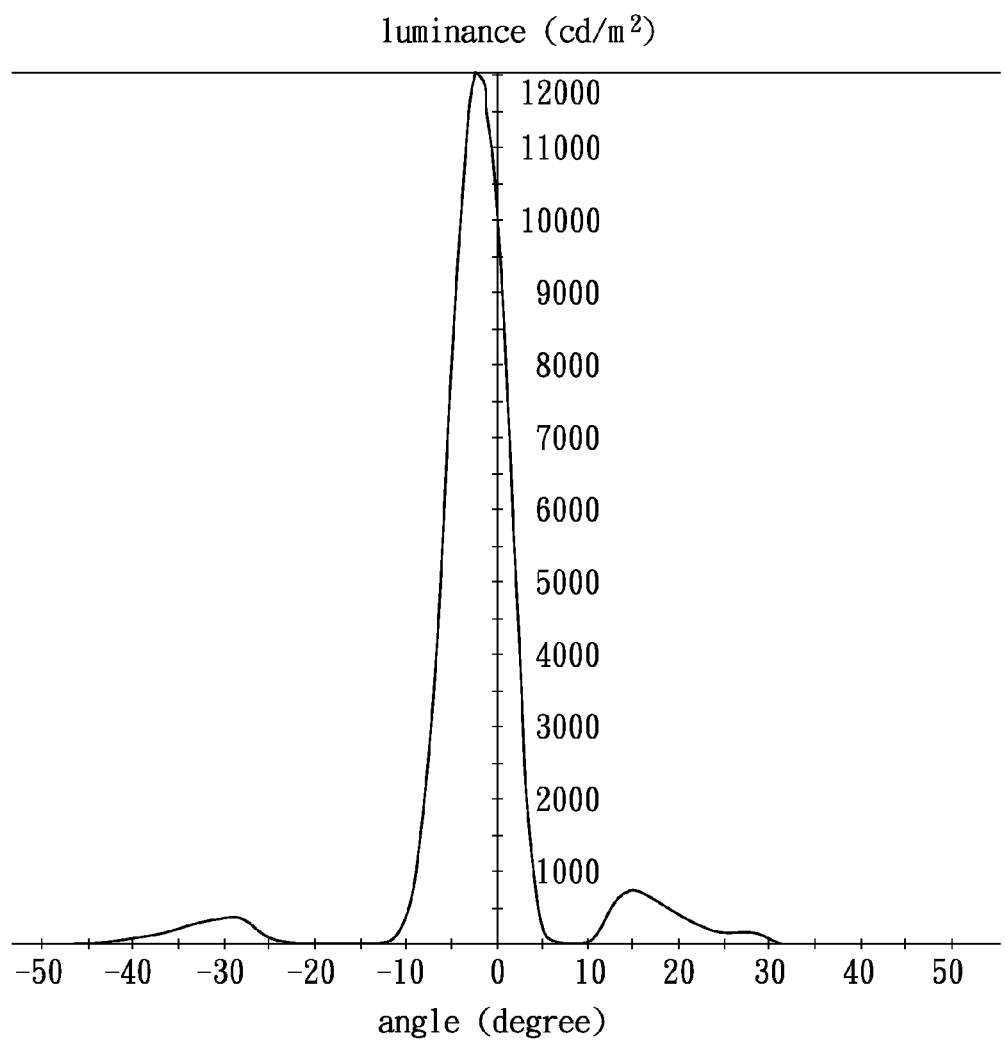
FIG. 8 is a luminance distribution diagram of light rays emitting from the optical film of FIG. 6.

FIG. 8 is a luminance distribution diagram of light rays emitting from the optical film of FIG. 6, wherein the transverse axis of the luminance distribution diagram represents a light emitting angle and the vertical axis of the luminance distribution diagram represents luminance. Referring to FIGS. 6 and 8, comparing to FIGS. 2 and 4 of the conventional technique, the optical film 300 of the present embodiment may greatly increase the luminance of the backlight module 200, especially in the positive direction. Therefore, the backlight module 200 of the present embodiment may provide the light source having high luminance.

Figure 9:
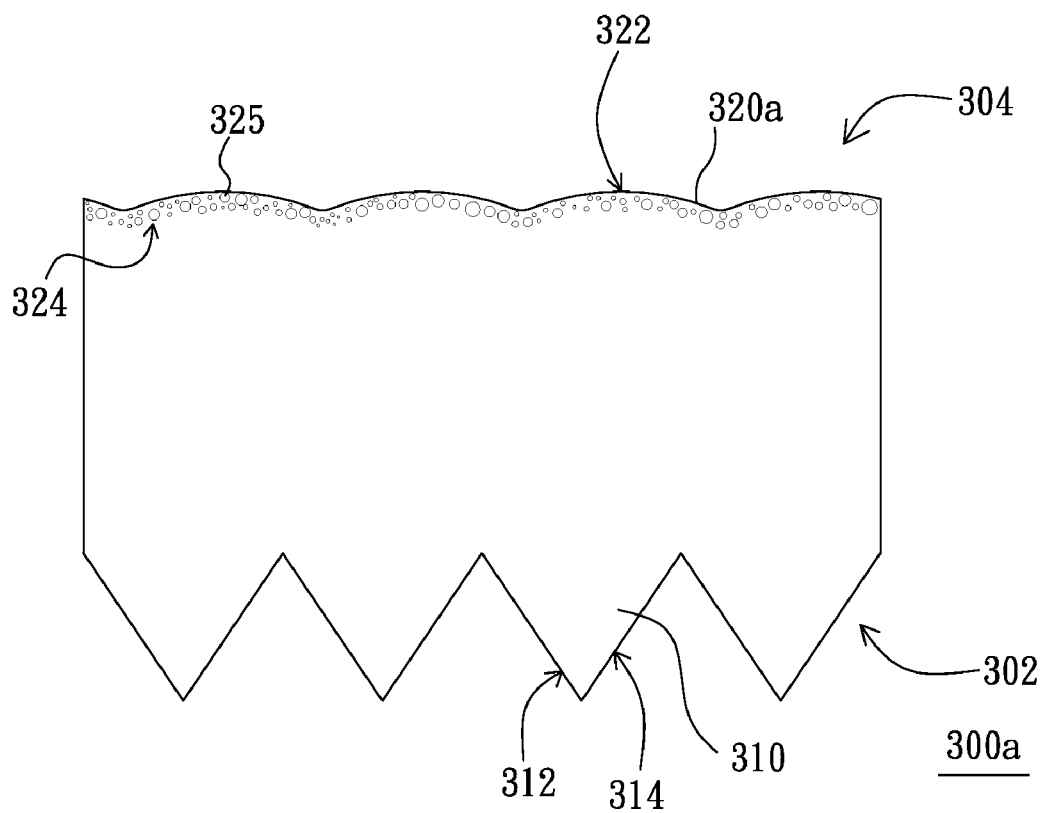
FIG. 9 is a schematic view of an optical film according to another embodiment of the present invention.

FIG. 9 is a schematic view of an optical film according to another embodiment of the present invention. Referring to FIG. 9, the optical film 300a of the present embodiment is similar to the optical film 300 of FIG. 6, and the only difference will be described below. In the present embodiment, a light diffusion structure 324 is disposed at a light emitting surface 322 of each of collimating units 320a of the optical film 300a, wherein the light diffusion structure 324 includes a plurality of diffusion particles 325. Furthermore, each of the light diffusion structures 324 is not limited to the diffusion particles 325 in the present invention. In another embodiment, each of the light diffusion structures 324 may be a rough structure. In other words, the light emitting surfaces 322 are rough surfaces.

Figure 10:
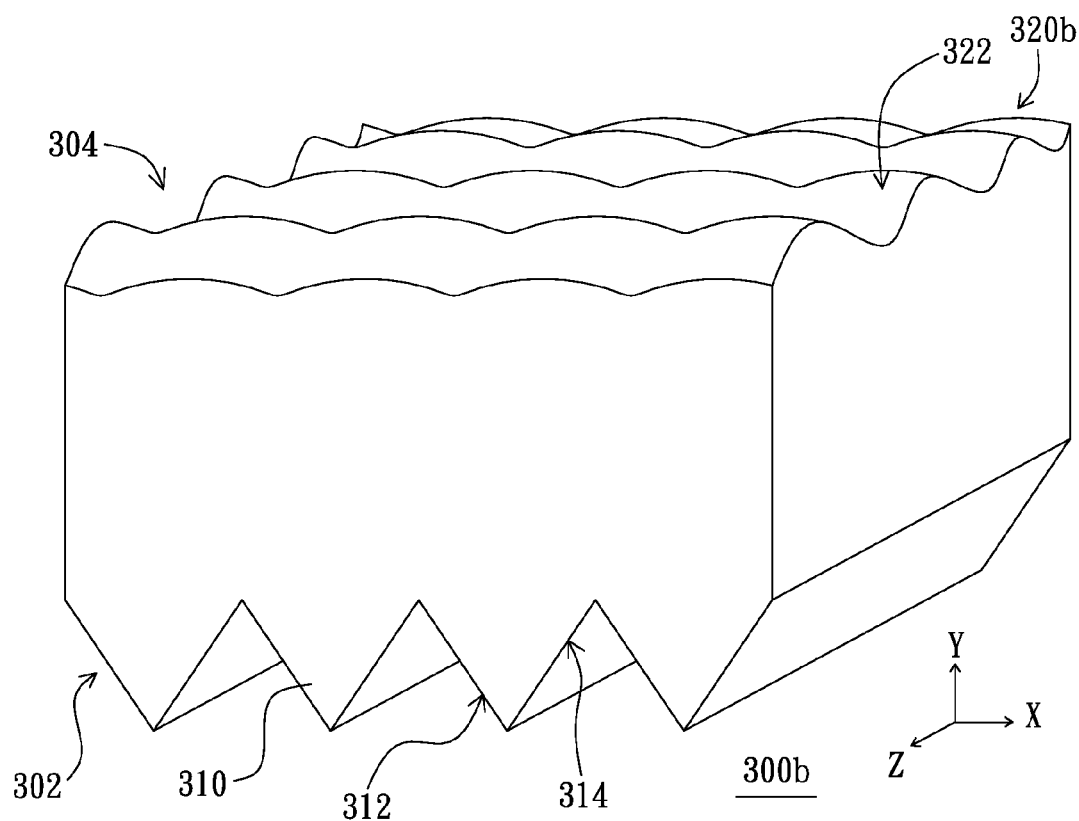
FIG. 10 is a schematic view of an optical film according to another embodiment of the present invention.

FIG. 10 is a schematic view of an optical film according to another embodiment of the present invention. Referring to FIG. 10, the optical film 300b of the present embodiment is similar to the optical film 300 of FIG. 6, and the difference is that each of collimating units 320b of the optical film 300b has a wave shape extending along the predetermined direction (i.e. the Z axis).

Figure 11:
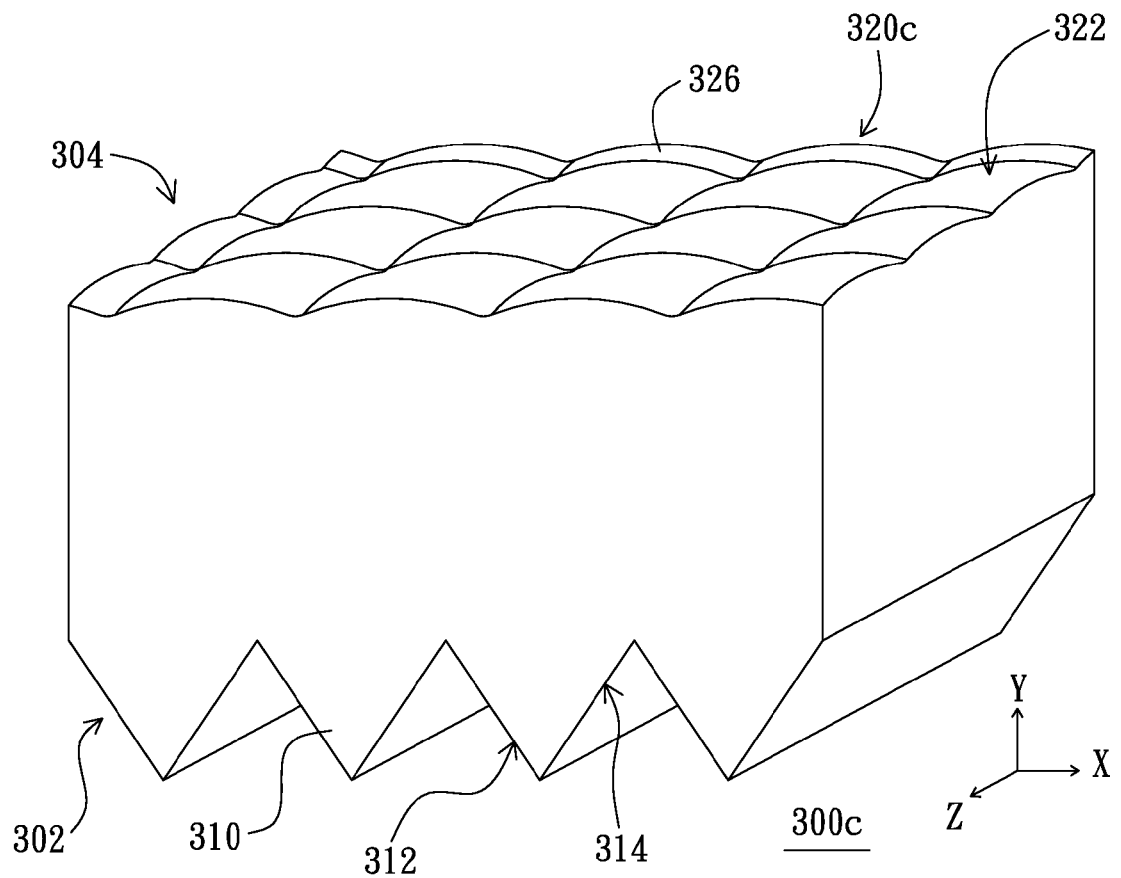
FIG. 11 is a schematic view of an optical film according to another embodiment of the present invention.

FIG. 11 is a schematic view of an optical film according to another embodiment of the present invention. Referring to FIG. 11, the optical film 300c of the present embodiment is similar to the optical film 300 of FIG. 6, and the difference is that each of collimating units 320c of the optical film 300c includes a plurality of lenses 326, and the lenses 326 are arranged along the predetermined direction (i.e. the Z axis).

In the embodiments of the present invention, the light diffusion structures such as the diffusion particles or the rough structures may be disposed at the light emitting surfaces 322 of the collimating units 320b of FIG. 10 and the light emitting surfaces 322 of the collimating units 320c of FIG. 11. The optical film 300 of the backlight module 200 of FIG. 5 may be replaced by the optical film 300a of FIG. 9, the optical film 300b of FIG. 10 or the optical film 300c of FIG. 11.

In summary, in the embodiments of the present invention, the collimating units are disposed at the light emitting side of the optical film, and in each corresponding pair of the collimating unit and the V shape protrusion, the central axis of the collimating unit parallel to the predetermined direction is opposite to the reflection surface of the V shape protrusion, so the diverging angle of the light rays can be converged and the viewing angle distribution of the light rays emitting from the light emitting side of the optical film is more symmetrical. Thus, the luminance of the backlight module is greatly increased. In other words, the backlight module using the optical film can provide the plane light source having high luminance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical film having a light incident side and a light emitting side above the light incident side, a plurality of V shape protrusions disposed side by side being disposed at the light incident side, each of the V shape protrusions extending along a predetermined direction, a plurality of collimating units disposed side by side being disposed at the light emitting side, each of the collimating units extending along the predetermined direction, the collimating units being respectively corresponded to the V shape protrusions, and two inclined surfaces of each of the V shape protrusions being respectively a light incident surface and a reflection surface, wherein in each corresponding pair of the collimating unit and the V shape protrusion, a central axis of the collimating unit is parallel to the predetermined direction and is right above the reflection surface of the V shape protrusion.

2. The optical film as claimed in claim 1, wherein in each corresponding pair of the collimating unit and the V shape protrusion, the central axis of the collimating unit is opposite to a central axis of a virtual image of the reflection surface of the V shape protrusion, the central axis of the virtual image is parallel to the predetermined direction, and the virtual image is defined by light rays reflected by the reflection surface.

3. The optical film as claimed in claim 1, wherein each of the collimating units includes a lenticular lens.

4. The optical film as claimed in claim 1, wherein each of the collimating units includes a plurality of lenses arranged along the predetermined direction.

5. The optical film as claimed in claim 1, wherein each of the collimating units has a wave shape extending along the predetermined direction.

6. The optical film as claimed in claim 1, wherein a light diffusion structure is disposed at a light emitting surface of each of the collimating units.

7. The optical film as claimed in claim 6, wherein the light diffusion structure includes a plurality of diffusion particles.

8. The optical film as claimed in claim 6, wherein the light diffusion structure includes a rough structure.

9. The optical film as claimed in claim 1, wherein thickness of the optical film is between 30 micrometers and 500 micrometers.

10. A backlight module comprising:
a light guide plate;
a light source disposed beside the light guide plate for providing light rays to the light guide plate; and
an optical film disposed above the light guide plate, the optical film having a light incident side and a light emitting side above the light incident side, a plurality of V shape protrusions disposed side by side being disposed at the light incident side, each of the V shape protrusions extending along a predetermined direction, a plurality of collimating units disposed side by side being disposed at the light emitting side, each of the collimating units extending along the predetermined direction, the collimating units being respectively corresponded to the V shape protrusions, two inclined surfaces of each of the V shape protrusions being respectively a light incident surface and a reflection surface, and in each corresponding pair of the collimating unit and the V shape protrusion, a central axis of the collimating unit being parallel to the predetermined direction and being right above the reflection surface of the V shape protrusion,
wherein, the light guide plate is adapted to guide the light rays into the optical film from the light incident surfaces of the V shape protrusions, and the reflection surfaces of the V shape protrusions are adapted to reflect the light rays to the light emitting side of the optical film.

11. The backlight module as claimed in claim 10, wherein in each corresponding pair of the collimating unit and the V shape protrusion, the central axis of the collimating unit is opposite to a central axis of a virtual image of the reflection surface of the V shape protrusion, the central axis of the virtual image is parallel to the predetermined direction, and the virtual image is defined by the light rays reflected by the reflection surface.

12. The backlight module as claimed in claim 10, wherein each of the collimating units includes a lenticular lens.

13. The backlight module as claimed in claim 10, wherein each of the collimating units includes a plurality of lenses arranged along the predetermined direction.

14. The backlight module as claimed in claim 10, wherein each of the collimating units has a wave shape extending along the predetermined direction.

15. The backlight module as claimed in claim 10, wherein a light diffusion structure is disposed at a light emitting surface of each of the collimating units.

16. The backlight module as claimed in claim 15, wherein the light diffusion structure includes a plurality of diffusion particles.

17. The backlight module as claimed in claim 15, wherein the light diffusion structure includes a rough structure.

18. The backlight module as claimed in claim 10, wherein thickness of the optical film is between 30 micrometers and 500 micrometers.

* * * * *